Figure 1:
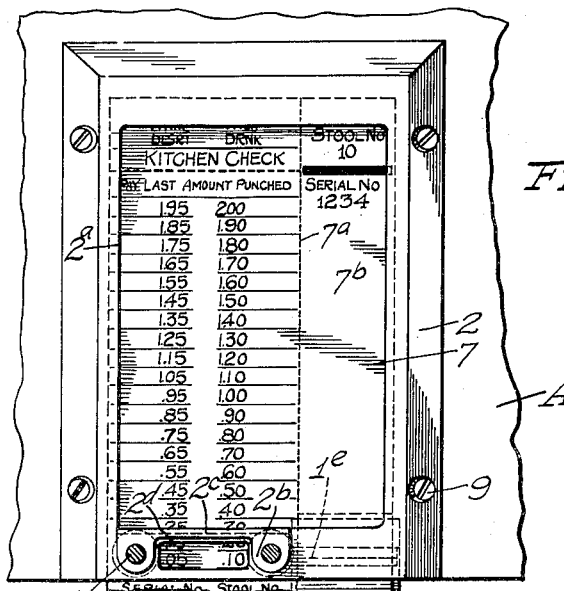

Sept. 5, 1933.  E. A. HAVELES  1,925,661

HOLDER FOR RESTAURANT CHECKS AND THE LIKE

Filed Sept. 19, 1928  2 Sheets-Sheet 1

INVENTOR.
EVANGEL A. HAVELES.
BY A. B. Bowman
ATTORNEY

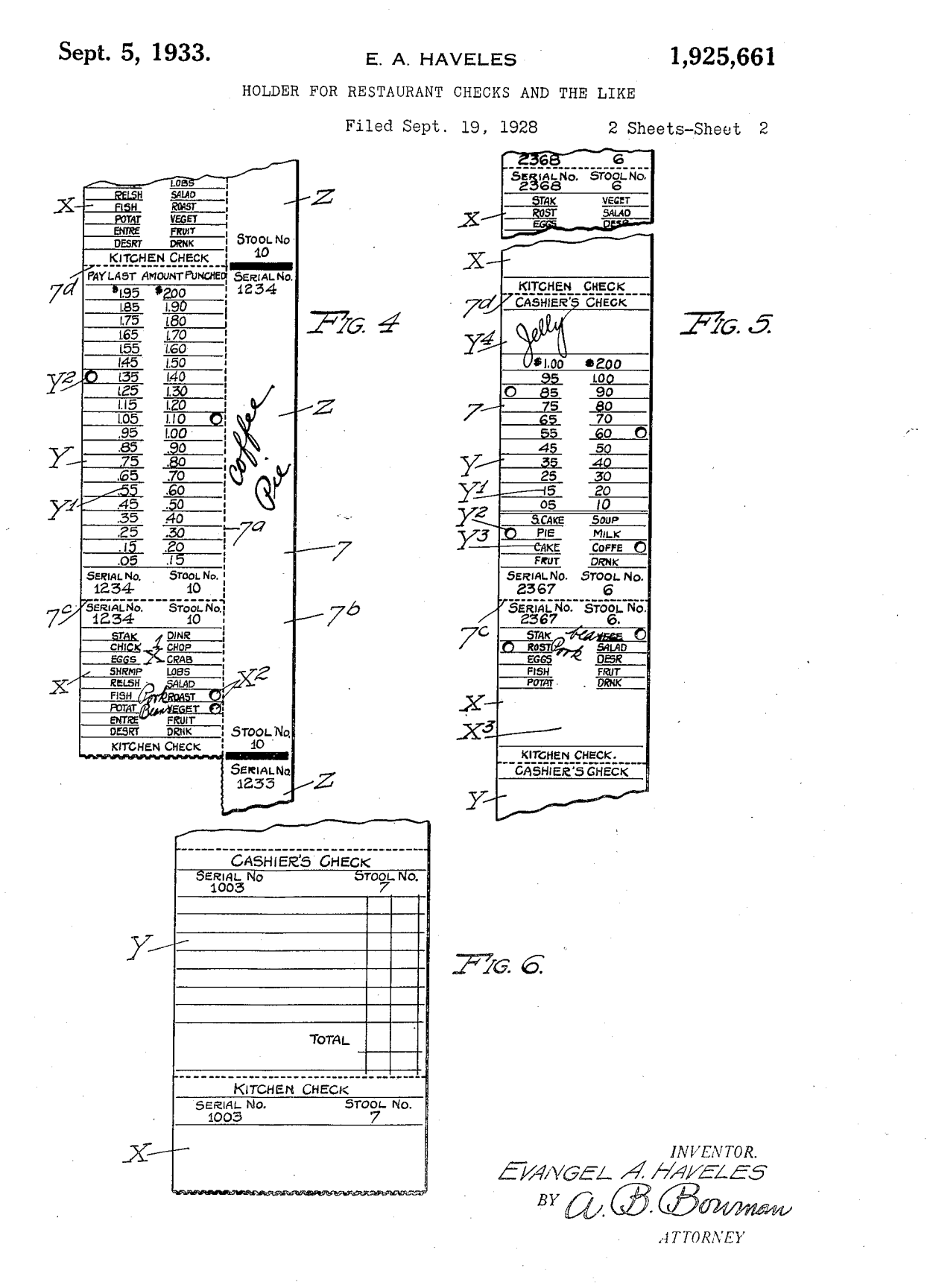

Sept. 5, 1933.  E. A. HAVELES  1,925,661

HOLDER FOR RESTAURANT CHECKS AND THE LIKE

Filed Sept. 19, 1928  2 Sheets-Sheet 2

INVENTOR.
EVANGEL A. HAVELES
BY A. B. Bowman
ATTORNEY

Patented Sept. 5, 1933

1,925,661

UNITED STATES PATENT OFFICE 1,925,661

HOLDER FOR RESTAURANT CHECKS AND THE LIKE

Evangel A. Haveles, Los Angeles, Calif.

Application September 19, 1928
Serial No. 306,895

5 Claims. (Cl. 281—7)

My invention relates to restaurant checks and to holders therefor.

The objects of this invention are: first, to provide a holder of this class for supporting or holding a multiplicity of connected restaurant checks which may be periodically and conveniently withdrawn therefrom and marked as the same are withdrawn therefrom; second, to provide a novel check perforating means at one end of the holder for variously perforating the checks as the same are withdrawn; third, to provide a novel and convenient check severing means in connection with the holder; fourth, to provide a holder of this class for containing a multiplicity of connected checks which are severable on a longitudinal line whereby a portion at one side of the longitudinal line may be retained in the holder as a record and checking means for the checks at the opposite side of the longitudinal line which are severable from each other; fifth, to provide novel means for severing the several portions of the checks on the longitudinal line and for winding up the record stub checks thereof; sixth, to provide as a whole a novelly constructed arranged and supporting means for the holder, and a holder which is very simple and economical of construction, durable and which will not readily deteriorate or get out of order; seventh, to provide a novel check system for restaurants whereby one of correspondingly numbered checks may be used as a kitchen check and for ordering items of food adapted to be prepared in the kitchen, and other checks similarly numbered for designating the price of the meal of the customer corresponding to the items of food designated on the kitchen check; eighth, to provide a check system of this class in which items of food, not designated on the kitchen check and not preparable in the kitchen, are designated on a record stub check of corresponding numbers, whereby the price indicated on the price check or cashier's check may be readily checked with the items of food ordered; and, ninth, to provide as a whole a novel system of checks for restaurants whereby accurate accounting may be made of the business done by the restaurant and whereby losses are reduced to a minimum.

Figures 2, 3:
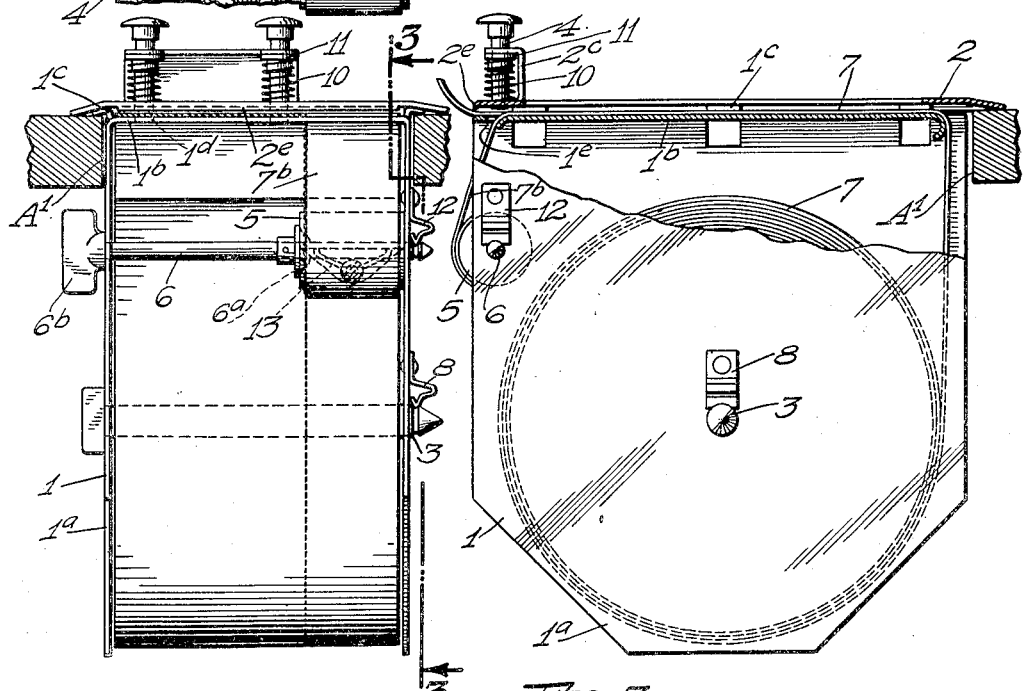

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a top view of my restaurant check holder in one form of construction, showing the same mounted upon and set into the inner edge of the counter of a restaurant; Fig. 2 is an end elevational view thereof taken from the inside of the counter; Fig. 3 is a partial and partial sectional view thereof taken at 3—3 of Fig. 2; Fig. 4 is a fragmentary view of a restaurant check as employed in the holder shown in Figs. 1, 2 and 3; Fig. 5 is a slightly modified form of such restaurant check; and, Fig. 6 is still another slightly modified form of my restaurant check.

Like characters of reference refer to similar parts and portions troughout the views of the drawings.

My restaurant check holder, shown in Figs. 1, 2 and 3, consists essentially of a frame or casing member 1, a top plate 2 mounted at the upper portion of the casing 1, a check roll supporting arbor 3, a pair of perforating members 4, a stub check winding drum 5, and a stub check winding drum supporting arbor 6.

The frame or casing 1, is preferably made of light sheet metal bent in U-shaped form with the legs thereof extending downwardly in parallel relation forming a space between the same in which is positioned the restaurant check roll 7 and which is revolubly mounted on the arbor 3 which extends transversely through the legs, designated 1a, of the casing 1 at the middle portions thereof, and is preferably readily removably held in position for supporting the roll 7 by a suitable spring clip 8. The connecting portion, designated 1b, connecting the upper portions of the legs 1a, forms the upper part of the casing 1. Above and spaced from the connecting portion 1b of the casing is the top plate 2 which extends at least from end to end and side to side of the connecting portion 1b of the casing, but extends preferably beyond the lateral edges and beyond the inner end of the casing as a flange for supporting the holder upon a restaurant counter, as shown. For the purpose of supporting the holder on the counter, the counter, designated A, is provided with an opening $A^1$ therein from the inner side or edge of the counter into which the holder is placed lengthwise. The holder so positioned within the counter is preferably secured thereto through the flanges of the top plate by screws 9, as shown in Fig. 1. The top plate 2 is here shown secured to the upper portion of the casing 1 by striking out ears 1c from the upper portions of the side walls or legs 1a of the casing 1 and bending the same upwardly and outwardly as shown in Figs. 2 and 3 for spacing the plate 2 from the casing 1 and for securing the same thereto. This plate 2 may be secured to the ears 1c by spot welding if desired.

The check roll 7 consists of various kinds of serially arranged, connected and severable checks, which will be described in detail hereafter. The end of the tape forming such checks extends upwardly from the roll 7 above the inner end of the top portion 1b of the casing, thence over said portion longitudinally therewith toward and to the opposite or rear end of the casing. The plate 2 is provided with a large opening at its middle portion through which the face of the several checks may be seen.

At the rear end of the casing and top plate, that is, the end adjacent the inner edge of the counter, is provided the check perforating means which consists of a pair of spaced apart punches 4. These punches are reciprocally mounted on vertical axes in guide portions 2b at the upper edge of a supporting portion 2c extending upwardly from the main portion of the top plate 2 and formed from a portion of the plate 2 bent upwardly to form the opening 2a. These punching members 4 are also guided in the main portion of the plate 2 at the lower ends of the punching members, as shown in Figs. 2 and 3. The lower punching ends of the members 4 are held substantially clear of the guide passage between the upper portion of the casing 1 and the plate 2 by springs 10 which are positioned around the punching members 4 and between the plate 2 and rigid shoulders or washers 11 on the punching members. The lower punching portions of the members 4 are adapted to extend through holes 1d in the upper portion 1b of the casing 1 for perforating the checks, thus forming a punch and die means for the perforating operation. In the plate 2 at the rear end thereof and between and in alignment with the punching members is a large opening 2d through which the characters on the checks may be seen for aligning the several characters, or spaces in which such characters are positioned, with the punches.

At the end of the top plate 2 at which the punching or perforating means is mounted, is provided a sharp or severing edge 2e so that, as the checks are withdrawn the desired distance, the same may be readily severed from the remaining checks by merely tearing off the withdrawn portion of the check along the severing edge 2e.

The checks comprising the roll 7 are severable into two portions on a longitudinal line extending the full length of all checks. This line, designated 7a, is preferably a weakened or perforated line, so that the two portions of the checks at the opposite sides of this line may be readily severed from each other. The portion at the one side or right side of this line, and designated 7b, consists of a series of record stub checks corresponding serially with those immediately opposite the line 7a. These record stub checks are adapted to be wound on the drum 5. The means for severing the record stub check 7b from the checks at the left, may consist of a slot 1e in the top portion 1b of the casing 1, as shown in Figs. 1 and 3. This slot is positioned a slight distance inwardly from the rear edge of the casing and transversely to the longitudinal extent of the casing. The record stub check portion 7b is extended through this slot and wound upon the drum 5. As the drum 5 is rotated, the record stub check portion 7b is severed from the other portion at the left side of the line 7a, and as the drum 5 is rotated, the other checks are drawn through the passage below the plate 2 and under the perforating means as far as desired for the proper perforation or marking of the checks. It will be here noted that the perforating means is in this instance positioned to the left only of the longitudinal severing line 7a of the checks. The drum 5 is non-rotatably mounted by a suitable key 6a on the arbor 6. This arbor may be provided at one end with a rotating key portion 6b for rotating the drum and is removably held in position by any suitable means such as a spring clip 12 engaging the end of the arbor 6. The end of the record stub check portion is temporarily secured to the drum 5 by any suitable means such as by a spring 13. When desiring to check the several checks with each other, the portions of the stub checks rolled upon the drum 5 are severed from the remaining portions of the checks and the drum 5 is removed with such severed stub checks. The removal of the drum 5 may be readily effected by merely withdrawing the arbor 6 from the one leg of the casing and from the drum.

The check means or check tape, shown in Figs. 1 and 4, comprises three different and separate checks X, Y and Z, the checks X and Y being at the left side of the severable line 7a and the checks Z at the righ side of such line. The checks X and Y are arranged in consecutive pairs and serially and differently numbered. Each pair of checks X and Y are arranged directly opposite a single check Z and correspondingly serially numbered therewith. The checks X and Y are all severable from each other and from the check Z. The several checks Z, designated above as the record stub checks, are all connected together as a continuous tape and wound upon the drum 5. The check X is designated the kitchen check and the check Y as the cashier's check. On the checks X are arranged, preferably in tabulated form, general items of food which are to be prepared in the kitchen. In order to designate the specific kind of the item of food, an appropriate marking is made thereon in a suitable space $X^1$ provided therefor. Thus, if the customer or patron desires to order a "pork roast" the word "pork" is written opposite the word "roast" as shown. If he also desires beans as a vegetable, the word "beans" is written opposite the word "vegetable," as shown. In order to avoid changing the record in the kitchen, the various general items are also permanently marked by perforations by the punching means, designated $X^2$. The kitchen check X is then withdrawn and severed on the line 7c and taken to the kitchen. The corresponding price of such order is designated on the check Y opposite the price indicated thereon by printed price characters designated $Y^1$; such marking is also made by perforating the check. If other items of food not preparable in the kitchen is desired, the same is written on the check Z, as shown, and the additional charge for such additional items are indicated on the check Y by further perforation, designated $Y^2$. When the customer or patron is through with the meal, the check Y is withdrawn, which may be done by manipulating the key 6b, as described above, and then severing the check Y on the line 7d. Thus, the next pair of checks is in position for the order of the next customer or patron.

It will be here noted that each check tape is designated for a particular stool on the counter or elsewhere so that the several checks may be readily compared with each other.

The check tape shown in Fig. 5 is similar to that shown in Fig. 4 except that the record stub checks are omitted and only the pairs of checks X and Y used. This check tape may be used on the device shown in Figs. 1, 2 and 3, if desired, or another holder may be provided with a narrower opening 2a in the top plate and a holder without the drum 5 and supporting and operating mechanism therefor. The check tape shown in Fig. 5 is adapted for restaurants where no such elaborate checking system is desired, as described above, or where more economical checks are desired to be used. The kitchen check X in the modified form is similar to the check X in the form shown in Fig. 4 except that less items are printed thereon and instead a blank space $X^3$ is provided at one end of the printed items of food to be prepared in the kitchen. The cashier's check Y is also provided with less price characters $Y^1$ and at the end thereof nearest the kitchen check, other items are printed which are not prepared in the kitchen or taken from the kitchen and which, in the formerly described form, were written on the check Z. Such items are designated $Y^3$ in Fig. 5 and may be marked by perforations $Y^2$ so that such indication cannot be changed by the patron. If desired, a blank space may be provided at the end of the column of price characters, as designated by $Y^4$. On this blank space may be written items which are not taken care of on the form. Thus, substantially a permanent record may be made on the kitchen checks of all foods prepared in the kitchen and of the general items kept in the dining room. Since the unusual items entered at the space $Y^4$ are few, no great loss can be sustained if no permanent mark is made therefor.

The check means shown in Fig. 6 is substantially similar to that shown in Fig. 5, except that no items or price characters are printed thereon, but instead the items ordered are written on the cashier's check with the price thereof, and on the kitchen check X are also written the items which are to be prepared in the kitchen; thus, in this instance, a check is also made of the food prepared in the kitchen.

Though I have shown and described a particular construction, combination and arrangement of parts and portions of my restaurant check holder and certain forms of restaurant checks, I do not wish to be limited to these particular constructions, combinations and arrangements of parts and portions, but desire to include in the scope of my invention the construction, combination and arrangement and relation substantially as set forth in the appended claims.

Having thus described my invention, what I claim as new and desire to secure by Letters Patent is:

1. In a check holder of the class described, a frame, a check roll supporting arbor mounted at the lower portion thereof, said frame having a check guide portion at its upper side, a punch and die means at the upper side and one end of said frame, and a stub check winding drum revolubly mounted on and within said frame at the last mentioned end thereof adapted to wind a portion of the checks passing through the holder.

2. In a holder of the class described, a frame, a check roll supporting arbor revolubly mounted on said frame and adapted to support a roll of check tape containing separate checks dividable on a line extending longitudinally of the tape, said frame having at its upper side a longitudinal guide extending from one end of the frame to the other and adapted to receive the tape, a check punching means mounted on said frame at the last mentioned end thereof adapted to punch said checks at the last mentioned end of the frame, and a stub check winding drum mounted on said frame at one side of its median line and adapted to wind thereon a portion of the checks at one side of said longitudinal line.

3. In a holder of the class described, a frame, a check roll supporting arbor revolubly mounted on said frame and adapted to support a roll of check tape containing separate checks, and a record stub check winding drum mounted on said frame at one side of its median line and adapted to wind thereon a portion of the checks on the tape.

4. In a holder of the class described, a frame, a check roll supporting arbor revolubly mounted on said frame and adapted to support a roll of check tape containing separate checks, a record stub check winding drum mounted on said frame at one side of its median line and adapted to wind thereon a portion of the checks on said tape and a check severing means on said frame adjacent said winding roll adapted to facilitate the transverse severing of the other portion of the checks on said tape from each other.

5. In a holder of the class described, a frame, a check roll supporting arbor revolubly mounted on said frame and adapted to support a roll of check tape containing separate checks, and a record stub check winding drum mounted on said frame adapted to wind thereon, a portion of said tape at one side thereof, the upper portion of said frame having a transverse slot opposite said winding drum, the portion of the frame forming the inner end of the slot being adapted to sever said tape on a longitudinal line as said portion of the tape is drawn through the slot and wound on said drum.

EVANGEL A. HAVELES.